US00RE34927E

United States Patent [19]

Meguro et al.

[11] E Patent Number: Re. 34,927

[45] Reissued Date of Patent: May 2, 1995

[54] MAGNETIC TAPE CASSETTE WITH TAPE PROTECTIVE CLOSURE AND LOCK MECHANISM

[75] Inventors: Hiroshi Meguro, Miyagi; Yoshinori Yamamoto, Kanagawa; Masao Ohyama, Tokyo; Kenichi Horikawa, Tokyo; Shigeru Mizusawa, Tokyo; Kenji Kawakami, Tokyo, all of Japan

[73] Assignee: Sony Corporation

[21] Appl. No.: 218,696

[22] Filed: Mar. 28, 1994

Related U.S. Patent Documents

Reissue of:

[64] Patent No.: 4,881,137
Issued: Nov. 14, 1989
Appl. No.: 240,423
Filed: Sep. 1, 1988

U.S. Applications:

[60] Continuation of Ser. No. 791,796, Nov. 8, 1991, abandoned, which is a continuation of Ser. No. 867,940, May 29, 1986, abandoned, which is a division of Ser. No. 704,943, Feb. 25, 1985, Pat. No. 4,843,510.

[30] Foreign Application Priority Data

Mar. 7, 1984 [JP] Japan ..... 59-43574

[51] Int. Cl.[6] ..... G11B 23/04; G11B 15/32

[52] U.S. Cl. ..... 360/96.5; 360/132

[58] Field of Search ..... 360/85, 96.1, 96.5–96.6, 360/132, 93

[56] References Cited

U.S. PATENT DOCUMENTS

| | | | |
|---|---|---|---|
| 3,759,529 | 9/1973 | Yoshii | 274/4 C |
| 3,900,172 | 8/1975 | Kamaya | 242/198 |
| 4,235,395 | 11/1980 | Wardenaar et al. | 242/199 |
| 4,372,504 | 2/1983 | Shibata et al. | 242/198 |
| 4,485,988 | 12/1984 | Kibuya et al. | 242/198 |
| 4,572,461 | 2/1986 | Horikawa et al. | 242/198 |
| 4,576,345 | 3/1986 | Koken et al. | 242/198 |
| 4,673,145 | 6/1987 | Emori | 360/132 X |

FOREIGN PATENT DOCUMENTS

| | | | |
|---|---|---|---|
| 60-55573 | 3/1985 | Japan | 360/132 |

*Primary Examiner*—John H. Wolff
*Attorney, Agent, or Firm*—Ronald P. Kananen

[57] ABSTRACT

A magnetic tape cassette is provided with a pivotal closure lid pivotably secured to both sides of a casing for movement between a closed position, in which the front opening of the casing, through which a magnetic tape is accessible for loading onto a rotary head, is covered, and an open position wherein the closure lid is pivoted away from said opening to expose the tape while the cassette is in use. The magnetic tape cassette is also provided with a sliding closure member slidably mounted on the bottom of the casing and cooperative with the aforementioned pivotal closure lid. The sliding closure member is in a closed position while the pivotal closure lid is in its closed position, in which it covers a bottom clearance through which a device constituting part of a tape holding system is inserted, and in an open position while the pivotal closure lid is in its open position to allow the aforementioned device of the tape handling system to reach into the casing through the bottom clearance. A locking pin holds the sliding closure in the current one of its two positions. The sliding closure holds the pivotal closed while in its own closed position.

47 Claims, 6 Drawing Sheets

MAGNETIC TAPE CASSETTE WITH TAPE PROTECTIVE CLOSURE AND LOCK MECHANISM

Matter enclosed in heavy brackets [ ] appears in the original patent but forms no part of this reissue specification; matter printed in italics indicates the additions made by reissue.

This application *is a continuation of reissue application Ser. No. 07/791,796, filed Nov. 8, 1991, now abandoned, which is a reissue application of Ser. No. 07/240,923, filed Sep. 1, 1988, which issued on Nov. 14, 1989, as U. S. Pat. No. 4,881,137,* is a continuation of application Ser. No. 867,940 filed May 20, 1986, now abandoned, which in turn is a division of application Ser. No. 704,943 filed Feb. 25, 1985, now [abandoned] *U.S. Pat. No. 4,843,510.*

BACKGROUND OF THE INVENTION

The present invention relates generally to a recording and reproducing apparatus for a magnetic tape cassette, such as a tape cassette especially adapted to recording and reproducing pulse code modulated (PCM) signals. More specifically, the invention relates to a cassette holder in a magnetic tape cassette recording and reproducing apparatus, in which the tape cassette is provided with a tape protective closure covering a front opening through which a magnetic tape is extracted and accessed, and a locking mechanism for locking the closure open when the cassette is in use and locking it closed when not in use.

In recent years, various recording and reproducing apparatus have been developed which convert analog signals, such as audio signals and the like into a digital signal, e.g. PCM signal, which is then recorded on and reproduced from magnetic tape serving as a recording medium. Some of these apparatus employ rotary heads in order to achieve a relatively high recording density. Recording and reproducing apparatus specifically designed to record and reproduce PCM signals and employing a rotary head will be referred to as "PCM recorder" throughout the disclosure. A PCM recorder, at first, pulls a loop of a magnetic tape out through a front opening of the cassette and winds the tape around a rotary drum accommodating the rotary head and then the recording and reproducing is performed. In such digital recording and reproducing systems, oily deposits, such as fingerprints or the like, and/or dust adhering to the tape surface may cause dropout of reproduced signals.

Various approach have been tried to protect the magnetic recording medium. For example, the co-pending U.S. patent application Ser. No. 678,813, filed on Dec. 6, 1984 now issued as U.S. Pat. No. 4,673,145 discloses a magnetic tape cassette which has a closure lid for retractably covering the front end opening of the cassette, through which the tape is extracted for access by a rotary head. This closure lid is held closed while the tape is not in use and is moved to an open position when the cassette is inserted into the PCM recorder. In this earlier approach, a drawback may be encountered when the closure lid is unintentionally or accidentally opened, exposing the tape to oily fingerprints, dust and so forth while it is not in use. A locking mechanism which can conveniently lock the closure lid in its open and closed positions could resolve this problem.

The magnetic tape cassette disclosed in the aforementioned U.S. patent application Ser. No. 678,813 U.S. Pat. No. 4,673,145 also has a sliding closure for closing a lower openings for accepting entry of loading device and tape reel drive of the recording and reproducing apparatus. The sliding closure may also be movable between open and close positions.

In order to enable a recording and reproducing apparatus for aforementioned type of magnetic tape cassette to handle, there has to be provided a mechanism or device for releasing the locking mechanism from locking position so that the closure may move between open and close positions.

SUMMARY OF THE INVENTION

Therefore, it is an object of the present invention to provide a mechanism or a device which can effectively releasing locking of a locking mechanism of a magnetic tape cassette and whereby enable closures of the magnetic tape cassette to move between open and close positions.

Another object of the present invention is to provide a recording and reproducing apparatus for a magnetic tape cassette, which is effectively prevent the magnetic tape cassette from being inserted in wrong direction.

As will be appreciated, the lock release mechanism of the present invention is applicable for a magnetic tape cassette of the such type type that is provided with a pivotal closure lid pivotably secured to opposite edges of a casing for movement between a closed position, in which the front opening of the casing through which a magnetic tape can be extracted for loading onto a rotary head while not in use, and an open position wherein the closure lid is pivoted away from said opening to allow access to the tape while in use; is also provided with a sliding closure member slidably mounted on one face of the casing and cooperative with the aforementioned pivotal closure lid, which sliding closure member is held either in a closed position while the pivotal closure lid is in its closed position to cover a bottom spacing through which a device constituting part of a tape handing mechanism may be inserted, or an open position while the pivotal closure lid is in its open position to allow the aforementioned device of the tape handling mechanism to engage the casing through the bottom spacing for extracting the tape for loading onto the rotary head, and is retained in its closed and open positions by means of a locking member; and the locking member is associated with the cassette casing and adapted to resiliently establish locking engagement with the sliding closure member. The locking member has a locking head engageable to the sliding closure member but not protruding from the lower surface of the sliding closure member.

In the preferred embodiment of the magnetic tape cassette, the locking member comprises a resilient arm integrally extending from the bottom of the cassette casing and a locking head formed integrally with the free end of the resilient arm.

According to the present invention, a locking releasing mechanism is provided in a cassette holder of the recording and reproducing apparatus which comprises a projection means which is active for releasing locking to allow movement the sliding closure member for movement from closed position to the open position when the magnetic tape cassette is correctly inserted thereto. The lock releasing mechanism also include means for inhibiting insertion of the magnetic tape cassette thereto when the inserting direction of the cassette is wrong direction.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment illustrated but are for explanation and understanding only.

In the drawings.

DESCRIPTION OF THE PREFERRED EMBODIMENT

Figure 1:
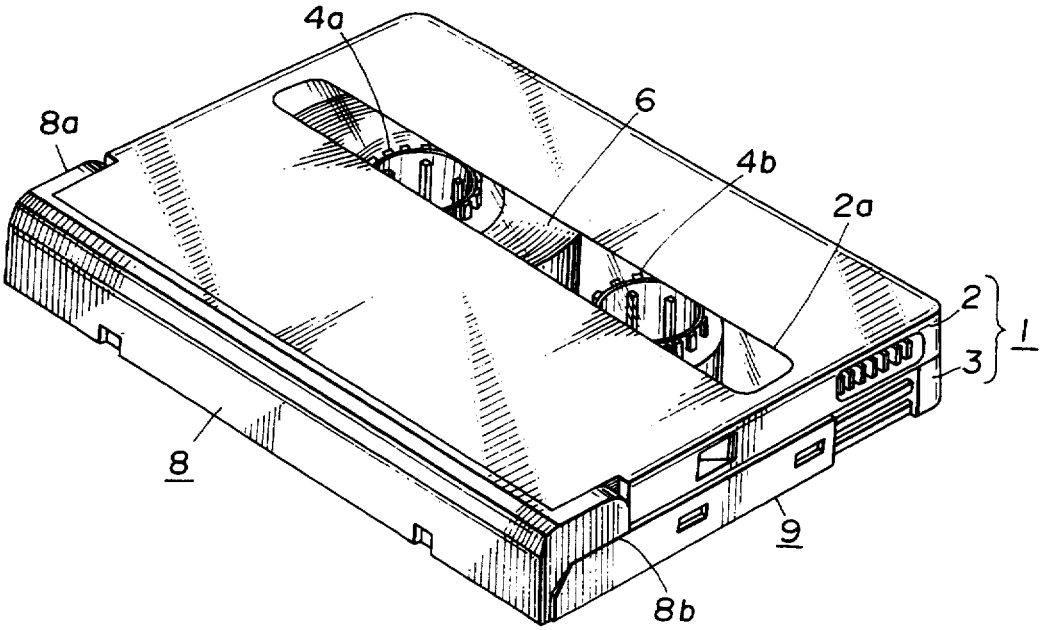
FIG. 1 is a perspective view of the preferred embodiment of a magnetic tape cassette in accordance with the present invention, in which a pivotal closure lid and a sliding closure member are in their respective closed positions.

Referring now to the drawings, particularly to FIGS. 1 to 4, the preferred embodiment of a magnetic tape cassette according to the present invention generally comprises a casing 1 including an upper section 2 and a lower section 3 which are connected by threaded bolts (not shown) in a per se well-known manner, to form a single unit. A transparent window plate 2a is built into the upper surface of the upper section 2. A pair of reel hubs 4a and 4b incorporated into the cassette casing 1 rotatably engage a pair of reel shaft insertion apertures 5a and 5b. The apertures 5a and 5b are formed in the lower section 3 at predetermined positions which establish a suitable spacing between the reel hubs 4a and 4b. A magnetic tape 6 is wound around the reel hubs 4a and 4b.

A pivotal closure lid 8 is rotatably or pivotally attached at the right and left side walls of the cassette casing near the front end of the tape cassette. When the pivotal closure lid 8 is pivoted away from the front surface of the tape cassette, the magnetic tape 6 is exposed. An essentially rectangular cut-out 3a is formed in the front end of the lower section 3. When the magnetic tape cassette is inserted into a PCM recorder which will be briefly discussed later, a tape guide system or a device constituting part of a tape retaining mechanism (not shown) which pulls out some of the tape 6 for loading onto a rotary head of the PCM recorder, is inserted into the cut-out portion 3a. A sliding closure member 9 engages the lower section 3 and covers and exposes the cut-out portion 3a as it slides back and forth.

While the tape cassette is not in use, the pivotal closure lid 8 is located opposite a front opening formed in the front surface of the casing 1 to cover the latter. At the same time, the sliding closure 9 is in its forwardly-shifted position in which it covers the cut-out portion 3a of the lower section 3 and thus prevents the tape guide system from reaching into the tape cassette for the tape. The pivotal closure lid 8 can pivot away from the front surface of the cassette to expose the magnetic tape 6, and the sliding closure member 9 can move to the rear to expose the cut-out portion 3a so that the tape guide system can reach into the cut-out portion 3a to draw some of the magnetic tape 6 out of the cassette casing for loading onto a rotary drum for recording or playback. Thereafter, when the recording or playback is over and the tape cassette is returned to the stand-by state, the pivotal closure lid and the sliding closure member are returned to the aforementioned closed positions. Throughout the rest of this document, the positions of the pivotal closure lid 8 and the sliding closure 9 in which they cover the front opening and the cut-out portion 3a respectively will be referred to as "stand-by position" and the position of the lid 8 and the closure 9 in which they expose the front opening and the cut-out portion 3a will be referred to as "use position".

Figure 4:
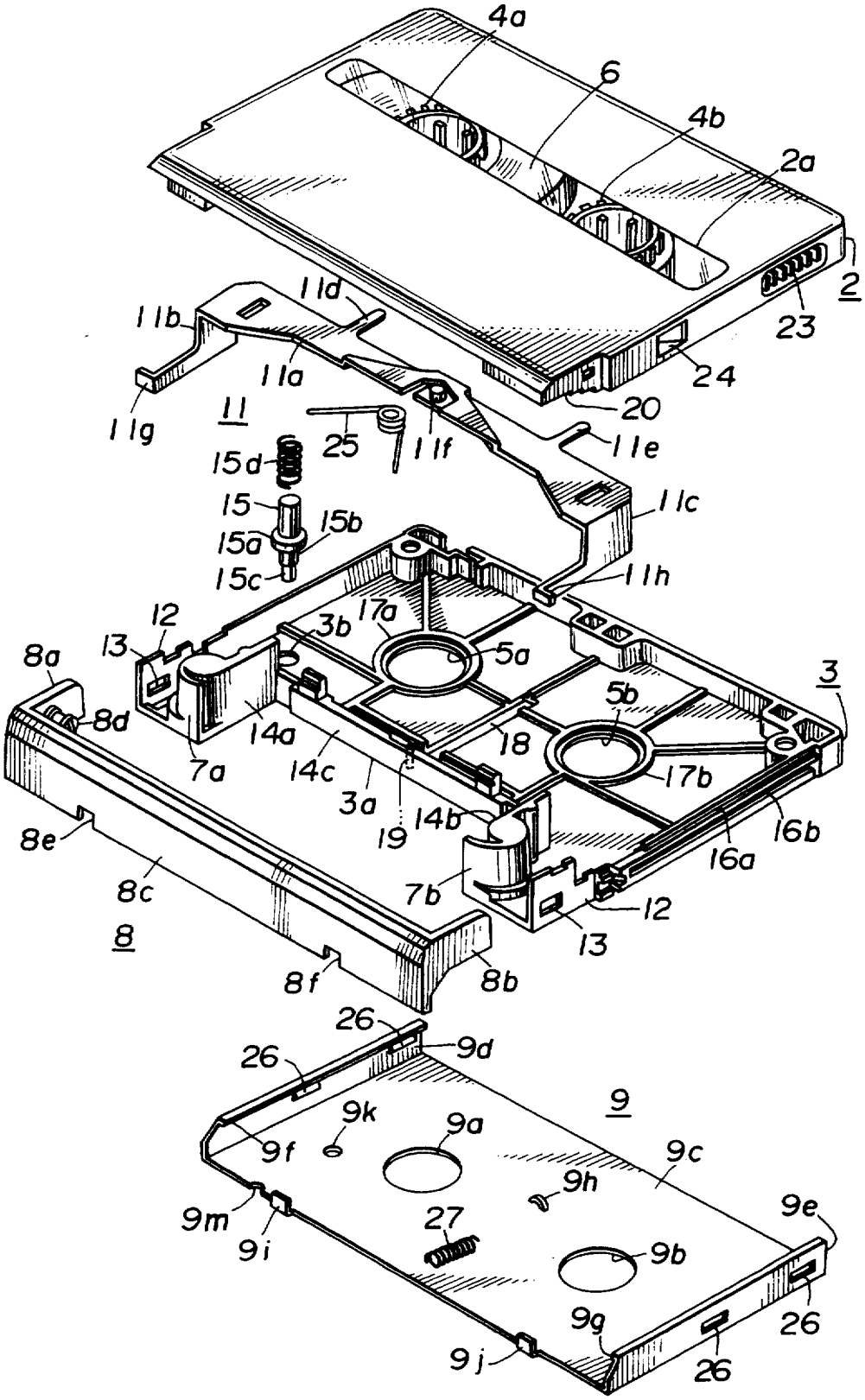
FIG. 4 is an exploded perspective view of the magnetic tape cassette of FIG. 1.

The cassette casing 1 also has a pair of tape guide columns 7a and 7b integrally formed to the left and right sides of the front edge of the lower section 3, as shown in FIG. 4. The magnetic tape 6 is stretched between and around the tape guide columns 7a and 7b so as to follow a predetermined tape run or path along the front edge of the tape cassette and across the front opening over the rotary head.

The essentially rectangular cut-out portion 3a of the lower section 3 extends over a predetermined width so as to expose the rear surface of the magnetic tape 6 stretched between the tape guides 7a and 7b. During recording or reproduction, a device constituting part of the tape handling system or the tape guide system projects into the cut-out portion 3a and draws out a section of the magnetic tape 6. The tape handling system is part of the PCM recorder.

Figure 2:
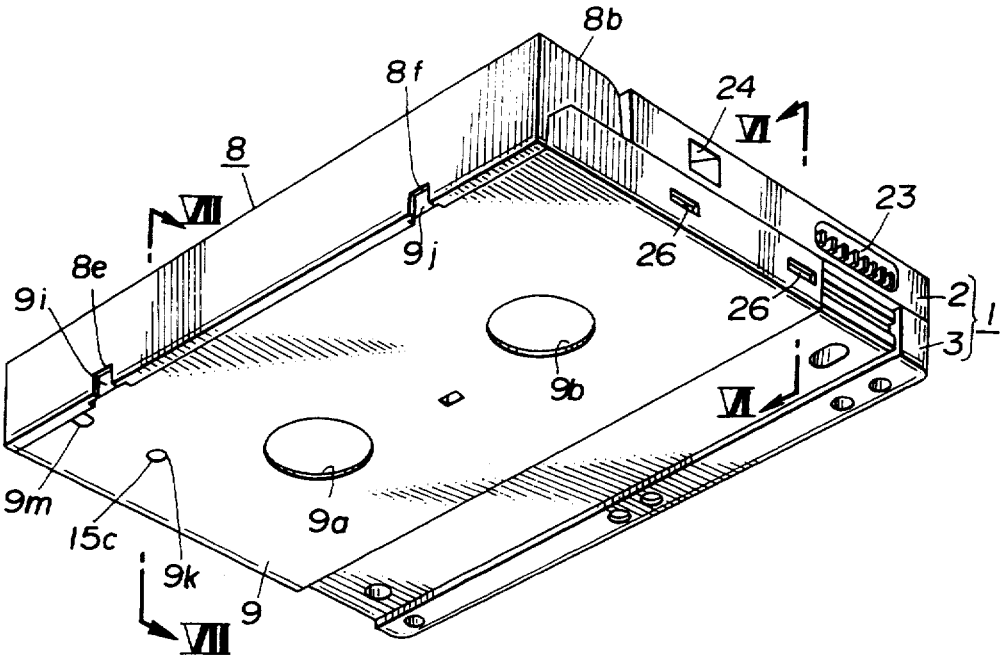
FIG. 2 is a perspective view of the magnetic tape cassette of FIG. 1, viewed from the lower side of the cassette, in which the pivotal closure lid and the sliding closure member are in their respective closed positions for use of cassette, corresponding to the position illustrated in FIG. 1.
Figure 3:
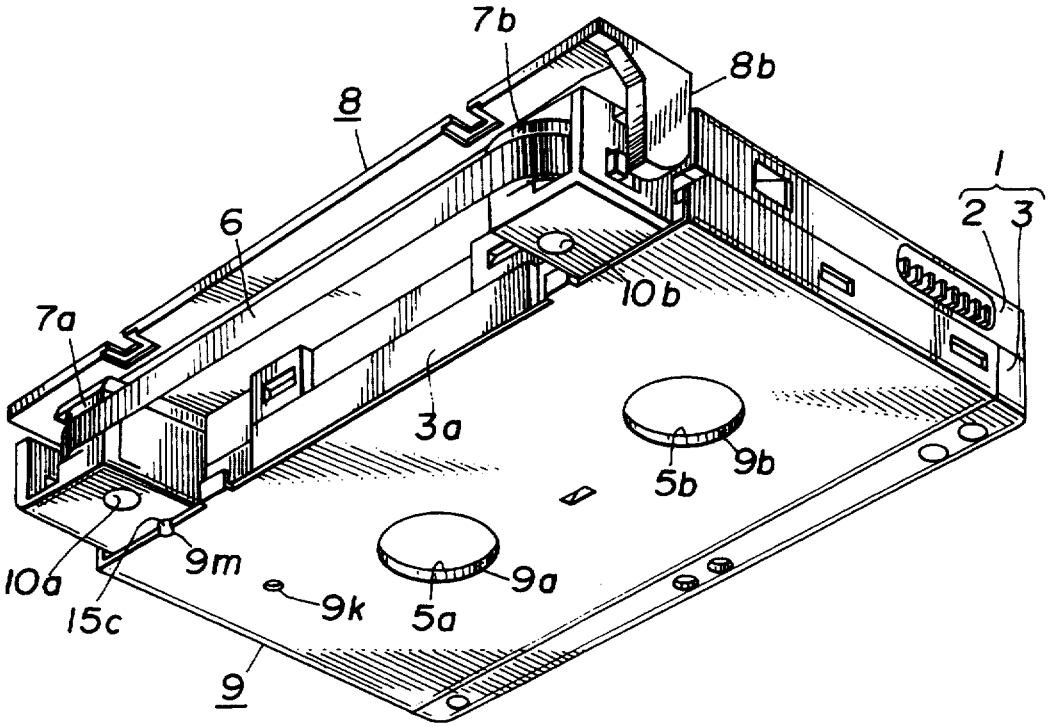
FIG. 3 is a perspective view of the magnetic tape cassette of FIG. 1, viewed from the lower side of the cassette, in which the pivotal closure lid and the sliding closure member are in their respective opens position during use of the cassette.

The pivotal closure lid 8 is elongated along the major dimension of the front opening and has arms 8a, 8b projecting from its opposite ends which pivotably attach lid 8 to the front of the cassette casing 1 by means of pivot shafts 8d. Thus, the pivotal closure lid 8 can be pivoted to selectively cover and expose the front opening of the cassette casing 1. The closure lid 8 also comprises a plate 8c which is elongated in the direction of the opening in the cassette casing 1 and covers the entire length of the front of the cassette casing 1. When the closure lid 8 is rotated to the closed position to cover the front of the cassette casing 1, the arms 8a and 8b lie flush with the contours of the upper section 2 as best shown in FIGS. 1 and 2. When the closure lid 8 is in this position, the closure member 9 is held in its forward position under the arms 8a and 8b as shown in FIGS. 2 and 3 by means described later. The rotary shafts 8d (only one of which is visible in FIG. 4) about which the lid 8 pivots are approximately centered on the inner surfaces of the respective arms 8a, 8b. Cut-away portions 8e, 8f are formed by cutting small grooves into the lower edge of the plate 8c toward the left and right extremes of the cut-out portion 3a of the lower section 3.

The sliding closure member 9 has a flattened U-shaped configuration and is so mounted on the lower section 3 of the cassette casing 1 that it can slide back and forth parallel to the lower surface of the lower cassette section 3. Apertures 9a and 9b respectively corresponding to the reel shaft insertion apertures 5a and 5b are formed in the sliding closure member 9 in such positions that after the sliding closure member 9 slides all the way backwards to expose the cut-out portion 3a, the apertures 9a and 9b are respectively aligned with the reel shaft insertion apertures 5a and 5b.

Positioning holes 10a and 10b are formed through the bottom of the lower section 3 directly under the tape guide columns 7a and 7b respectively.

The sliding closure 9, as shown in FIG. 4 comprises a flat plate 9c which lies parallel to the lower surface of the lower section 3 and side plates 9d, 9e along the left and right sides of the flat plate 9c while lie parallel to the outer surfaces of the left and right side walls of the lower section 3. Flanges 9f and 9g are formed by bending the upper ends of the side plates 9d, 9e inwardly. The flanges 9f, 9g are restrained vertically but not horizontally between the side walls of the upper and lower sections 2, 3 after the casing 1 is assembled. After assembly, a spring-engaging anchor 9h formed on the flat plate 9c projects through a spring-accomodating slot 18 in the lower section 3. The spring anchor 9h anchors one end of a tension coil spring 27 designed to bias the closure member 9 in the forward direction. The other end of the tension coil spring 27 engages a spring-engaging column 19 disposed near the cut-out 3a of the lower section 3, with the result that the closure member 19 is biased forward toward a position in which it covers the cut-out portion 3a. This movement of the sliding closure 9 also moves the apertures 9a, 9b out of register with the apertures 5a, 5b so as to completely enclose the tape 6.

Contact pieces 9i and 9j extend upwards perpendicularly from the flat plate 9c at the front of the plate at positions which correspond to the cut-away portions 8e and 8f of the closure lid 8. The contact pieces 9i and 9j enable the recording-reproducing apparatus to slide the closure 9 to the rear in preparation for opening the cassette 1 in a manner described below.

FIG. 4 shows the relative position of the closure lid 8, the sliding closure 9, a reel brake member 11, which is described below, the upper section 2 and the lower section 3. Each of these components may be made of synthetic resin, such as ABS resin. The lower section 3 comprises an essentially rectangular flat plate of in which the reel shaft insertion apertures 5a and 5b are formed and a frame including left and right side walls, a front portion in which the tape guide colunms 7a, b are formed and a rear wall. Most of the side walls and the outer surface of the flat plate of the lower section 3 are recessed so that the sliding closure 9 lies flush with the outer surface of the remainder of the side walls and floor of the lower section 3.

The front ends of the left and right side walls are stepped laterally inwards by the thickness of the arms 8a, 8b of the closure lid 8 to form support walls 12. The tops of the support walls 12 are formed with indentations. When the upper section 2 and lower section 3 are assembled with the lower section 3, matching support walls 20 in the upper section 2 abut the support walls 12 edge-to-edge. The indentations then form apertures allowing pivotal mounting of the rotary shafts 8d (only one of which is visible in FIG. 4) of the closure lid 8. Rectangular insertion apertures 13 are formed near the front, lower corners of the support walls 12. Shields 14a, 14b and 14c define the three wails of the cut-out portion 3a, whereby the inside of the cassette casing 1 is shielded from the cut-out portion 3a.

Stepped rests 16a (only one of which is visible in FIG. 4) extend along the upper edges of the left and right side walls of the lower section 3 and parallel thereto. The depth of the stepped rests 16a is not as great as the thickness of the arms 8a, 8b of the closure lid 8. Guide grooves 16b extend along each of the side wall of the lower section 3 parallel to each other and to the stepped rests 16b. Similarly to the rests 16a, the guide grooves 16b are not as deep as the arms 8a and 8b of the closure lid 8 are thick.

Figure 6:
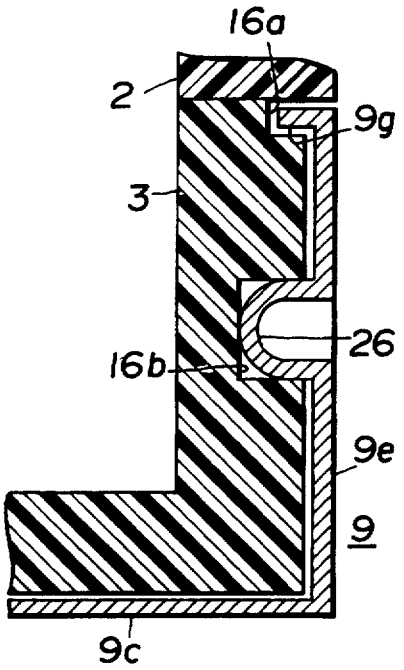
FIG. 6 is an enlarged section taken along line VI—VI of FIG. 2.

As best shown in FIG. 6, the stepped rests 16a receive the upper edges 9g of the sliding closure 9. Also, the guide groove 16b slidably receives inwardly depressed indentations 26 formed in the side plates 9d and 9e of the sliding closure 9. Sliding engagement between the rests 16a and the edges 9g and between the guide grooves 16b and the indentations 26 guides sliding movement of the sliding closure 9 with respect to the cut-out portion 3a along the side walls of the lower section.

Annular collar or flange portions 17a, 17b encircle each of the reel shaft insertion apertures 5a, 5b.

In order to bias the sliding closure 9 toward the forward closed position, the rectangular spring accommodating slot 18 formed in the bottom plate 3c of the lower section 3 is centered between the reel shaft insertion apertures 5a, 5b and extends with its major dimension parallel to the front-to-rear direction. The spring-engaging column 19 is positioned at the forward end of the spring-accommodating slot 18. The tension spring 27 biasing the closure member 9 forwards is stretched between the column 19 and the anchor projection 9h formed on the closure member 9.

Figure 5:
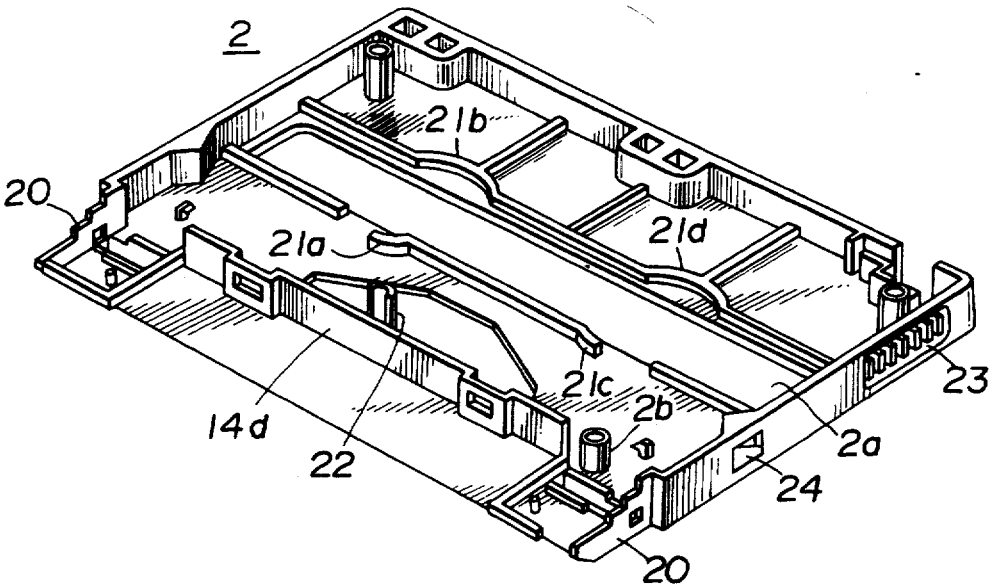
FIG. 5 is a perspective view from the above of the upper section of the tape cassette of FIG. 1, the upper section being shown upside down.

FIGS. 4 and 5 show details of the upper section 2. The upper section 2 comprises an essentially rectangular flat plate in which the transparent window plate 2a is formed and a frame including left and right side walls and a rear wall. The outer contours of the upper section 2 match the outer contours of the lower section 3 and the sliding closure 9.

Support walls 20 are formed so that the forward ends of the left and right side walls are offset inwardly by the thickness of the arms 8a and 8b of the closure lid 8, as are the support wails 12 of the lower section 3. The support walls 20 and 12 define apertures as described above when they are assembled edge-to-edge.

A shielding wall 14d (FIG. 5) is designed to mate with the shielding wall 14c (FIG. 4). When the upper section 2 and lower section 3 are coupled, the shielding walls 14d and 14c abut each other, thereby separating the inside of the cassette casing from the cut-out portion 3a.

Arcuate collars 21a, 21b, 21c and 21d are formed in alignment with the annular collars 17a and 17b of the lower section 3. The reel hubs 4a and 4b are rotatably supported by the collars 21a, 21b and 21c, 21d of the upper section 2 and the annular collars 17a and 17b of the lower section 3. The collars 21a, 21b, 21c and 21d are approximately as thick as the portion of the reel brake member 11 which contact the upper section 2, so that the reel brake member 11 can not protrude beyond the collar portions 21a, 2lb, 21c and 21d. This prevents the reel brake member 11 from damaging the magnetic tape 6.

A fixing boss 22 (FIG. 6) of U-shaped configuration in cross-section is formed on the upper section 2 opposite the spring-engaging column 19 of the lower section 3. When the upper section 2 and lower section 3 are connected, the spring-engaging column 19 is received within the opening of the fixing boss 22, and hence the end of the coil spring 26 engaging the spring-engaging column 19 is retained by the end of the fixing boss 22.

A knurled recess 23 is formed near the rearward end of each of the right and left side walls to facilitate a secure grip when the cassette is held in the hand. V-shaped concave supports 24 are formed near the center of the left and right side walls. When the tape cassette is loaded in the recording and reproducing apparatus, the concave supports 24 are engaged by support studs shown) from both the right and the left.

Figure 7:
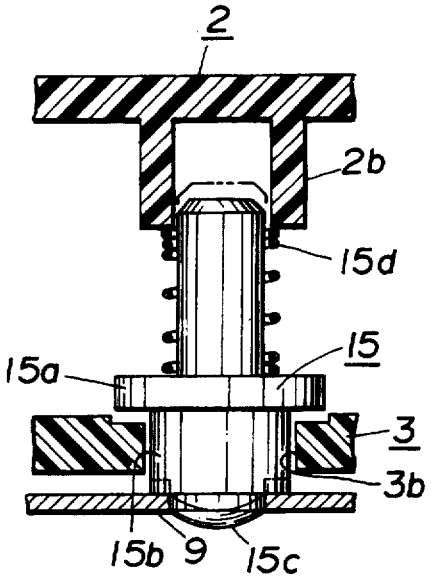
FIG. 7 is an enlarged partial section taken along line VII—VII of FIG. 2.

As shown in FIGS. 5 and 7, a hollow cylindrical boss 2b extends downwards from the upper section 2. A cylindrical locking pin 15 opposing the boss 2b can slide into and out of it vertically. The locking pin 15 has a lower locking head 15c at the end distal from the boss 2b. A flange 15a is formed on the locking pin 15 between the proximal end and the locking head 15c. The looking head 15c is connected integrally to the proximal end and the flange 15a through a section 15b. The section 15b is cylindrical and has a larger diameter than the proximal end. The cylindrical section 15b extends through a circular opening 3b through the lower section. The locking head 15c engages either a circular first locking opening 9k or a semicircular second locking opening 9m, both formed in the flat plate 9c of the sliding closure 9. When the locking head 15c engages the first locking opening 9k, it locks the sliding closure 9 in its closed position. On the other hand, when the head 15c engages the second locking opening 9m, it locks the closure member 9 in its open position.

The locking pin 15 can slide longitudinally into and out of the boss 2b. A bias spring 15d is wound around the proximal end of the locking pin 15. The upper end of the bias spring 15d seats on the lower end of the boss and the lower end of the bias spring 15d seats on the flange 15a. In other words, the flange 15a serves as a spring seat for the spring 15d. At the same time, the flange 15a serves to limit the downward travel of the locking pin in response to the force of the spring 15d. For this reason, the diameter of the flange 15a is larger than the internal diameter of the opening 3b through the lower section.

The spring 15d constantly biases the locking pin downwards so that the locking head 15c protrudes out of the lower surface of the lower section 3 through the opening 3b. The locking pin 15 is normally held in its locking position in which it restricts sliding movement of the sliding closure 9.

Figure 8:
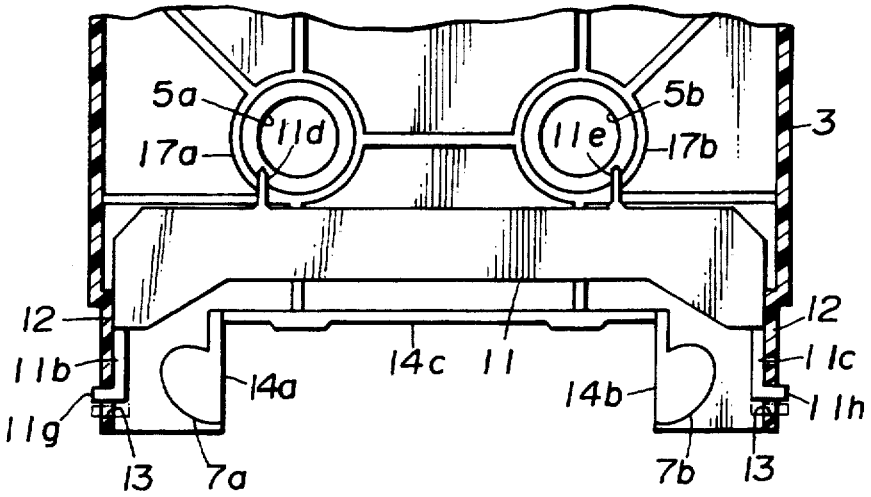
FIG. 8 is a plan view of the lower section of the tape cassette shown in FIG. 4 with the edges of the lower section partially cut away to show the mode of engagement between a brake member and the lower section.

As shown in FIGS. 4 and 8, the reel brake member 11 comprises a slide guide plate 11a which is elongated in a direction parallel to the front opening of the casing and to the lid 8 and lies along the inner surface of the upper section 2. The member 11 also comprises L-shaped arms 11b, 11c which respectively extend perpendicularly downward from either end of the slide guide plate 11a and then forward. Brake pins 11d and 11e corresponding to the reel hubs 4a and 4b respectively extend rearward from the slide guide plate 11a. Brake wheels are formed on the outer peripheral portions of the reel hubs 4a and 4b opposite the brake pins 11d and 11e.

Figure 11:
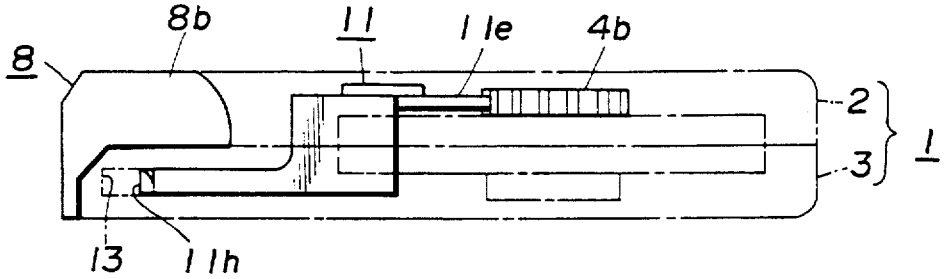
FIG. 11 is a diagramatic elevation of the magnetic tape cassette of FIG. 1 showing the pivotal closure lid and the sliding closure member in their closed positions while the cassette is not in use.

A spring-engaging stud 11f is provided at the center of the slide guide plate 11a, and operating tabs 11g and 11h are formed on the extreme ends of the arms 11b and 11c respectively. The center coil of a torsion spring 25 used to bias the reel brake member 11 towards its braking position is fitted onto the spring-engaging stud 11f. The free ends of the spring 25 press against the rear of the shield wall 14d (FIG. 5) of the upper section 2 so that the brake pins 11d, 11e normally engage the brake wheels of the reel hubs 4a and 4b (see FIG. 11), whereby the reel hubs 4a and 4b are prevented from rotating.

The reel brake member 11 is so disposed within the cassette 1 that the ends of the tabs 11g, 11h protrude through the insertion apertures 13 of the lower section 3 outside of the support walls 12 to a predetermined extent. When the closure lid 8 is pivoted upwards, the protruding tabs 11g, 11h are engaged by the ends of the arms 8a and 8b of the closure lid 8, and the reel brake member 11 is pulled forward against the biasing force of the spring 25. The brake pins 11d, 11e are thus disengaged from the brake wheels of the reel hubs 4a and 4b, allowing the reel hubs 4a and 4b to rotate (see FIG. 15). It should be noted that the closure lid 8 is driven upwards by actuating pins (not shown) of the recording/playback system when the cassette 1 is fully deployed in the operating position. The actuating pins provide the force needed to overcome the force of the torsion spring 25.

Referring to FIGS. 10 and 12 to 14, a pair of locking levers 34 are built into a cassette holder 33 at points opposite each of the cut-outs 8e and 8f in the closure lid 8. Each of the locking levers 34 is pivotably secured to the bottom of the cassette holder 33 for rotation about a pivot. Each of the locking levers has a first arm section 34L with a locking claw section 34N extending upwards from the free end of the first arm section. The locking levers 34 also have a second arm section 34s extending opposite the first arm section 34L with respect to the pivot. The first and second sections 34L and 34s extend oblique to each other in such a manner that, when the first arm section 34L is parallel to the bottom of the cassette holder 33, the second arm section 34s is at an angle of about 45 degrees relative to the bottom of the cassette holder 33.

Figure 10:
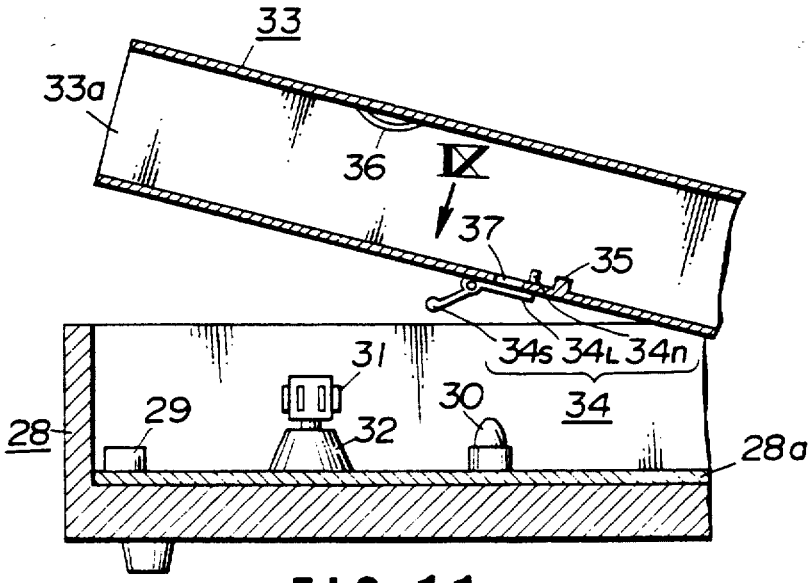
FIG. 10 is a partial section of a recording and reproducing apparatus (PCM recorder) with a rotary head to which the preferred embodiment of the magnetic tape cassette according to the present invention is applied.

Although it is nor clearly shown in the drawings, the locking lever 34 is associated with a biasing means, such as a torsion spring normally biasing the locking lever counterclockwise as viewed in FIG. 10. Therefore, as will be appreciated from FIG. 10, the first arm section 34L is normally biased toward the bottom of the cassette holder 33 and the second arm section 34a is normally held away from the bottom of the cassette holder as in FIGS. 10, 12 and 13.

The locking claw section 34n opposes an opening (not shown) through the bottom of the cassette holder 33. In the position of the cassette holder 33 of FIGS. 10, 12 and 13, the locking claw section 34n extends through the opening into the internal space of the cassette holder. The position of the locking claw when projecting into the internal space 33a of the cassette holder 33 matches the position of the front edge of the sliding closure 9 in its rearwardly shifted or open position. The locking claw section 34n thus restricts forward movement of the sliding closure 9 after the cassette is inserted into the cassette holder as far as the position shown in FIG. 12. A stopper 35 extends upwards from the floor of the cassette holder 33 near the opening for the locking claw 34n. The stopper 35 is designed to contact the front edge of the sliding closure 9 after the locking engagement between the locking claw 34n and the front edge of the closure member 9 is released to ensure that the closure member 9 will not abrupt shift forward and damage the recording and reproducing mechanism inserted into the cut-out portion 3a of the cassette. This function will be made clearer later.

The cassette holder 33 is also provided with a retainer spring 36 protruding from the ceiling of the cassette holder. The retainer spring 36 engages the upper surface of the tape cassette casing to restrict movement of the latter within the cassette holder.

In addition, a through opening 37 through the floor of the cassette holder 33 allows the head 15c of the locking pin 15 to extend therethrough.

Figure 12:
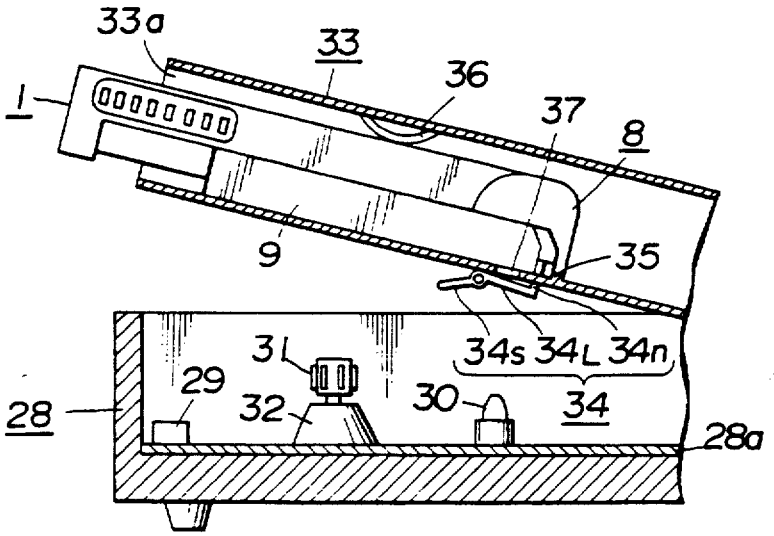
FIGS. 12, 13 and 14 are sections similar to FIG. 10, showing the process of insertion of the preferred embodiment of a magnetic tape cassette into the cassette holder.
Figure 13:
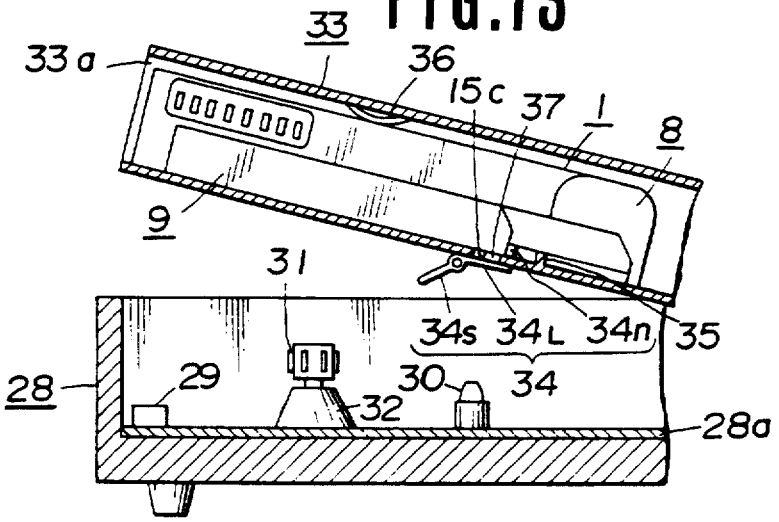
Figure 14:
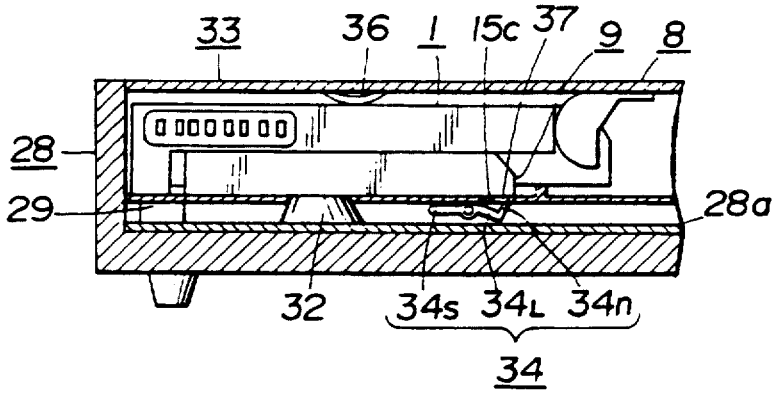

FIGS. 12 to 14 show the operation of the tape cassette 1. When the cassette 1 is not in use (see FIGS. 7 and 8), the front thereof is covered by the closure lid 8 and the sliding closure 9 is biased by the coil spring 27 to its forward position. In that case, the reel brake member 11 is biased rearward by the spring 25 and hence the brake pins 11d, 11e engage the brake wheels of the reel hubs 4a and 4b so that the reel hubs 4a and 4b are locked and cannot rotate. In addition, the reel shaft insertion apertures 5a and 5b of the cassette casing 1 and the corresponding apertures 9a and 9b in the sliding closure member 9 are offset from each other and the cut-out portion 3a is covered by the sliding closure 9. The magnetic tape 6 is thus fully enclosed to prevent dust from entering through the apertures 5a and 5b or the cut-out portion 3a and depositing on the magnetic tape 6, and fingers and the like from touching the magnetic tape 6. Furthermore, the side plates 9d and 9e of the closure member 9 are directly beneath the arms 8a and 8b, whereby the closure lid 8 is prevented from rotating. As a result, when the cassette is not in use, the closure lid 8 is prevented from being opened unintentionally.

In use, the tape cassette is loaded into a recording and reproducing apparatus 28. By inserting the tape cassette into the internal space 33a of the cassette holder 33, the head portion 15c of the locking pin 15 protruding through the hole 3b in the lower section 3 of the cassette casing 1 comes into contact with the floor of the cassette holder. At the same time, the locking claws 34n of the locking levers 34 of the cassette holder 33 of the recording and reproducing apparatus 28 engage the contact member 9i and 9j of the closure member 9 through the cut-away portions 9f and 8f or the closure lid 8. Then, as the tape cassette moves further forward into the recording and reproducing apparatus 28, the sliding closure 9 is held stationary by the locking claws 34n of the locking lever 34, while the cassette casing 1 moves against the biasing force of the coil spring 27.

When the cassette casing 1 is inserted into the cassette holder 33, the locking pin 15 is driven upwards out of the hole 9c to the position shown in phantom lines in FIG. 7 by contact with the floor of the cassette holder 33. From this position, since the end of the head portion 15c is rounded, an upward biasing force is applied to the locking pin by the edge of the opening 9k of the sliding closure 9 as the cassette casing 1 moves relative to the sliding closure member 9. The upward biasing force applied to the locking pin 15 overcomes the downward biasing force applied by the spring 15d and moves the locking pin 15 upwards. Until the sliding closure 9 disengages from the locking pin 15 to allow relative displacement of the cassette casing 1 and the sliding closure 9. A spacer 35 supports the lower section 3 during insertion.

Figure 9:
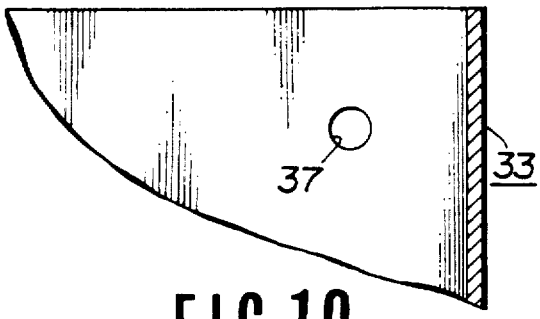
FIG. 9 is a partial plan view of a cassette holder of the recording and reproducing apparatus of FIG. 8, as viewed along arrow IX of FIG. 8.

Thus the sliding closure 9 slides backwards relative to the cassette casing 1, thus exposing the cut-out 3a and the positioning apertures 10 and 10b (FIG. 9), and aligning the apertures 9a and 9b of the closure member 9 with the reel shaft insertion apertures 5a and 5b so that the reel shaft insertion apertures 5a and 5b are opened.

After the cassette has been fully inserted into the cassette holder 33, the locking pin 15 comes into alignment with a hole 37 through the floor of holder 33 and drops through the holes 9m and 37, thus locking the sliding closure 9 and cassette casing 1 together again, as shown, in FIG. 13. From this position, the cassette holder 33 is ready to be lowered into the recording and reproducing system 28 to the position shown in FIG. 14, which position is specified by a spacer 29.

Figure 15:
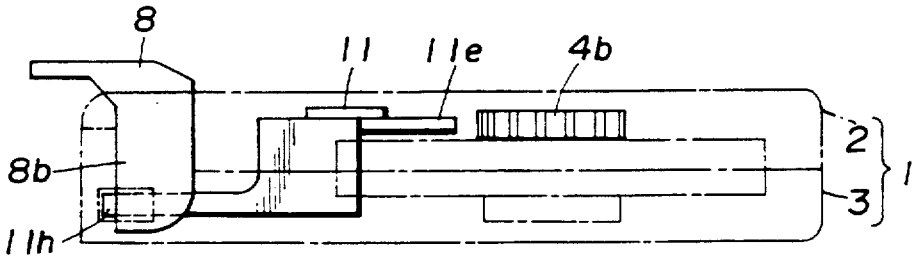
FIG. 15 is a diagrammatic elevation similar to FIG. 10, but showing the pivotal closure lid and the sliding closure member in their open positions while the cassette is in use.

The closure lid 8 is then rotated upwards by the lid actuating pins (not shown) of the recording and reproducing apparatus to the position shown in FIGS. 14 and 15. As the closure lid 8 pivots, the operating tabs 11g, 11h of the reel brake member 11 are pressed forward by the lower ends of the arms 8a, 8b, thus sliding the reel brake member 11 forward against the biasing force of the spring 25. This disengages the brake pins 11d and 11e from the brake wheels of the reel hubs 4a and 4b and releases the reel hubs 4a, 4b so that they can rotate.

Positioning protrusions 30 and reel shafts 31 of the recording and reproducing apparatus 28 are respectively inserted into the positioning apertures 10a and 10b and the reel shaft insertion apertures 5a and 5b, the magnetic tape 6 is exposed at the front of the cassette casing 1, and the tape guide system (not shown) is inserted into the cut-out portion 3a. The guide system draws out some of the magnetic tape and loads it onto the rotary drum of the recording and reproducing apparatus, and then the desired recording or playback can be carried out. Reference numeral 32 designates the base of the reel shaft 31.

When the magnetic tape cassette is taken out of service and returned to a standby condition, a procedure opposite to that described above is carried out.

It will be apparent from the preceding description of the preferred embodiments of the invention that many modifications and variations can be effected by one skilled in the art without departing from the scope of the invention. For example, while in the disclosed embodiments the spring 25 biases the brake member 12 toward the braking position and the lid 8 in moving from the closed position to the open position must overcome the force of the spring 25 in order to release the brake, it is also possible for a spring to bias the brake member 12 toward the released position and for the lid 8 in moving from the open position to the closed position to overcome the force of such a spring in order to apply the brake, Accordingly, the scope of the invention should be determined by the appended claims only.

What is claimed is:

1. A cassette holder in a recording [and] *and/or* reproducing apparatus said cassette holder comprising:

a holder body defining therein a cassette reception space and having a floor on which [said] *a* cassette is mounted; and

*unlocking* means, incorporated in said holder body and cooperatively associated with [said] *a* locking means *of said cassette*, for unlocking said locking means to allow movement of [said] *a* shutter member *of said cassette* from [said] *a* first position to [said] *a* second position when said [magnetic tape] cassette is inserted into said cassette reception space in a correct orientation, said unlocking means also serving to inhibit insertion of said [magnetic tape]cassette into said cassette reception space of said cassette holder in an improper orientation.

2. The cassette holder as set forth in claim 1, wherein said unlocking means comprises a projection means projecting from said floor of said holder body for actuating said locking means into an unlocking position to allow said shutter member to move from said first position to said second position, and for actuating said shutter member to move from said first position to said second position during insertion of said [magnetic tape] cassette into said cassette reception space in said holder body.

3. The cassette holder as set forth in claim 2, wherein said projection means comprises a first projection adapted to actuate said locking means into said unlocking position and a second projection adapted to actuate said shutter member from said first position to said second position.

4. The cassette holder as set forth in claim 3, wherein said second projection is further adapted to hold said shutter member at said second position while said [magnetic tape] cassette is in place in said cassette holder.

5. The cassette holder as set forth in claim 3, [in which said] *further comprising a* pivotal lid *which is pivotally supported on said cassette and which* has a first and a second cut-out in [its] *a* lower horizontal edge *thereof*, and said first projection passes through said first cut-out and said second projection passes through said second cut-out when said [magnetic tape] cassette is inserted into said cassette reception space in the correct orientation.

6. The cassette holder as set forth in claim 5, wherein said holder body has at least one opening through which said [magnetic tape] cassette is inserted, and said second projection is longitudinally offset from said first projection such that said second projection is located at a position remote from said opening with respect to said first projection.

7. The cassette holder as set forth in claim 6, wherein said second projection is also transversely offset from said first projection such that said second projection is located at a position remote from the central axis of said holder body with respect to said first projection, the central axis extending in the direction of said cassette.

8. The cassette holder as set forth in claim 6, wherein said second projection comprises a hook releasably engaging said shutter and exerting a sliding force thereupon as said cassette is inserted into said recording and reproducing apparatus.

9. The cassette holder as set forth in claim 5, wherein said holder body has at least one opening through which said [magnetic tape] cassette is inserted, and said second projection is transversely offset from said first projection such that said second projection is located at a position remote from the central axis of said holder body with respect to said first projection, the central axis extending in the direction of said cassette.

10. The cassette holder as set forth in claim 5, in which said [magnetic tape] cassette has a groove in [its] *a* lower surface *thereof*, said groove extending to a locking opening to establish locking engagement with said locking means at said first position of said shutter member and transversely opposing said first cut-out of said pivotal lid, and wherein said first projection enters and passes through said groove to actuate said locking means into said unlocking position.

11. The cassette holder as set forth in claim 10, in which said locking means has a locking head engageable with said locking opening to establish said locking engagement, and the depth of said groove at least matches the corresponding dimension of said locking head protruding from said shutter member, and wherein said first projection engaging said groove serves as a guide for insertion of said [magnetic tape] cassette into said cassette reception space.

12. The cassette holder as set forth in claim 3, wherein said first and second projections are formed integrally with said floor of said holder body.

13. The cassette holder as set forth in claim 1, which further comprises a lifter means, associated with said holder body, for moving said holder body up and down relative to a mechanical chassis of said recording and reproducing apparatus.

14. The cassette holder as set forth in claim 1, wherein said holder body also has a ceiling defining a opening box-shaped space open at front and rear and serving as said cassette reception space, which ceiling has means for resiliently biasing said [magnetic tape] cassette downward against said floor.

15. The cassette holder as set forth in claim 1, which is adapted for receiving said [magnetic tape] cassette which further comprises:

a pair of reel hubs housed in said cassette [casing holding], said *pair of reel hubs supporting* tape reels [within said cassette casing, around] *on* which a magnetic tape is wound and which is exposed from the lower surface of said cassette [casing] through openings formed in [the] *a* lower section of [the] *said* cassette [casing], a pivotable front lid mounted near the front of said cassette [casing] and covering an opening in [the] *a* front part of said cassette [casing], and *wherein* said [sliding] shutter member is formed with a pair of reel shaft insertion apertures through which a pair of reel shafts is inserted to engage said reel hubs, said [sliding] shutter member positioning said reel shaft insertion apertures in a position offset from said opening in the lower section of said cassette [casing] at its first position and in a position in alignment with said reel shaft insertion apertures at its second position.

16. A recording [and] *and/or* reproducing apparatus for a magnetic tape cassette which comprises a cassette casing having a mouth through which a magnetic tape is accessible, said mouth including a first opening in a front end face of said casing and a second opening in a lower section of the casing adjacent said front end face, a pair of tape reels around which said magnetic tape is wound, a pivotal lid covering and exposing said first opening of said mouth, a sliding shutter member slidable with respect to the lower section of said cassette casing and adapted to cover and expose said second opening in said lower section, said shutter member being movable between a first position in which it covers said second opening and a second position in which it exposes said second opening, and a locking means for normally holding said shutter member in said first position while said cassette is not in use, and allowing said shutter member to move to said second position when said cassette is inserted into an associated recording and reproducing apparatus, said recording and reproducing apparatus comprising:

a mechanical chassis mounting thereon a tape loading system, a tape drive system and magnetic head; and a cassette holder mounted on said mechanical chassis for receiving said magnetic tape cassette for recording and reproducing operations, said cassette holder comprising:

a holder body defining therein a cassette reception space and having a floor on which said cassette is mounted; and means, incorporated in said holder body and cooperatively associated with said locking means, for locking said locking means to allow movement of said shutter member from said first position to said second position when said magnetic tape cassette is inserted into said cassette reception space in a correct orientation, said unlocking means also serving to inhibit insertion of said magnetic tape cassette into said cassette reception space of said cassette holder in an improper orientation.

17. The apparatus as set forth in claim 16, wherein said unlocking means comprises a projection means projecting from said floor of said holder body for actuating said locking means into an unlocking position to allow said shutter member to move from said first position to said second position, and for actuating said shutter member to move from said first position to said second position during insertion of said magnetic tape cassette into said cassette reception space in said holder body.

18. The apparatus as set forth in claim 17, wherein said projection means comprises a first projection adapted to actuate said locking means into said unlocking position and a second projection adapted to actuate said shutter member from said first position to said second position.

19. The apparatus as set forth in claim 18, wherein said second projection is further adapted to hold said shutter member at said second position while said magnetic tape cassette is in place in said cassette holder.

20. The apparatus as set forth in claim 18, in which said pivotal lid is formed with a first and a second cut-out in its lower horizontal edge, and said first projection passes through said first cut-out and said second projection passes through said second cut-out when said magnetic tape cassette is inserted into said cassette reception space in correct direction.

21. The apparatus as set forth in claim 20, in which said magnetic tape cassette is formed with a groove in its lower surface, said groove extending to a locking opening to establish locking engagement with said locking means at said first position of said shutter member and opposing to said first cut-out of said pivotal lid, and wherein said first projection enters into and passes through said groove to actuate said locking means into said unlocking position.

22. The apparatus as set forth in claim 21, in which said locking means has a locking head engageable with said locking opening to establish said locking engagement, and the depth of said groove at least matches the corresponding dimension of said locking head protruding from said shutter member, and wherein said first projection engaging said groove serves as a guide for insertion of said magnetic tape cassette into said cassette reception space.

23. The apparatus as set forth in claim 20, wherein said first and second projections are formed integrally with said floor of said holder body.

24. The apparatus as set forth in claim 20, wherein said holder body has at least one opening through which said magnetic tape cassette is inserted, and said second projection is longitudinally offset from said first projection and located at a position remote from said opening with respect to said first projection.

25. The apparatus as set forth in claim 24, wherein said second projection is also transversely offset from said first projection such that said second projection is located such that said second projection is located at a position remote from the central axis of said holder body with respect to said first projection, the central axis extending in the direction of insertion of the cassette.

26. The apparatus as set forth in claim 24, wherein said second projection comprises a hook releasably engaging said shutter and exerting a sliding force thereupon as said cassette is inserted into said recording and reproducing apparatus.

27. The apparatus as set forth in claim 20, wherein said holder body has at least one opening through which said magnetic tape cassette is inserted, and said second projection is transversely offset from said first projection such that said second projection is located at a position remote from the central axis of said holder body with respect to said first projection, the central axis extending in the direction of insertion of the cassette.

28. The apparatus as set forth in claim 16, which further comprises a lifter means, associated with said holder body, for moving said holder body up and down relative to said mechanical chassis of said recording and reproducing apparatus.

29. The apparatus as set forth in claim 16, wherein said holder body also has a ceiling defining box-shaped space open at front and rear and serving as said cassette reception space, which ceiling has means for resiliently biasing said magnetic tape cassette downward against said floor.

*30. A cassette holder in a recording and reproducing apparatus for a magnetic tape cassette comprising a cassette casing having a mouth through which a magnetic tape*

*is accessible, said mouth including a firs opening in a front end face of said casing and a second opening in a lower section of the casing adjacent said front end face, a pair of tape reels around which said magnetic tape is wound, a pivotal lid covering and exposing said first opening of said mouth, a sliding shutter member slidable with respect to the lower section of said cassette casing and adapted to cover and expose said second opening in said lower section, said shutter member being movable between a first position in which it covers said second opening and a second position in which it exposes said second opening, and a locking means for normally holding said shutter member in both of said first and second positions and allowing said shutter member to move from said first position to said second position when said cassette is inserted into an associated recording and reproducing apparatus, and from said second position to said first position when said cassette is ejected from said cassette holder comprising:*

*a holder body defining a cassette reception space and having a floor on which said cassette is mounted; and*

*means, incorporated in said holder body and cooperatively associated with said locking means, for unlocking said locking means, said unlocking means having a first component active at said first position of said shutter member to allow movement of said shutter member from said first position to said second position when said magnetic tape cassette is inserted into said cassette reception space, and a second component active for unlocking said locking means at said second position of said shutter member for allowing movement of said shutter member from said second position to said first position when said magnetic tape cassette is ejected from said recording and reproducing apparatus.*

*31. The cassette holder as set forth in claim 30, wherein said unlocking means comprises a projection means projecting from said floor of said holder body, said projection means having a leading edge serving as said first component for actuating said locking means into an unlocking position to allow said shutter member to move from said first position to said second position during insertion of said magnetic tape cassette into said cassette reception space in said holder body, and a trailing edge serving as said second component for actuating said locking means into an unlocking position to allow said shutter member to move from said second position to said first position during ejection of said magnetic tape cassette from said cassette reception space in said holder body.*

*32. The cassette holder as set forth in claim 31, wherein said leading and trailing edges of said projection means are slanted so that the functions of said locking means are smoothly accomplished.*

*33. The cassette holder as set forth in claim 30, which is adapted to receive magnetic tape cassettes which further comprise a pair of reel hubs housed in said cassette casing which hold said tape reels within said cassette casing, and around which a magnetic tape is wound and which are exposed from the lower surface of said cassette casing through openings formed in the lower section of the cassette casing, a pivotable front lid mounted near the front of said cassette casing and covering an opening in the front part of said cassette casing, and said sliding shutter member is formed with a pair of reel shaft insertion apertures through which a pair of reel shafts can engage said reel hubs, said sliding shutter member positioning said reel shaft insertion apertures in a position offset from said opening in the lower section of said cassette casing at its first position and in alignment with said reel shaft insertion apertures at its second position.*

*34. The cassette holder according to claim 30, wherein said unlocking means comprises a projection means projecting from said floor of said holder body.*

*35. The cassette holder according to claim 30, wherein said holder body further comprises a pair of projections projected from said floor of said holder body at the rear edge of said floor, said projections engaging said shutter member when the cassette is inserted into said holder body.*

36. *A cassette holder in a recording and reproducing apparatus for a magnetic tape cassette of the type which comprises a cassette casing, a sliding shutter member slidable with respect to a portion of said cassette casing and adapted to cover and expose an opening in said portion of said cassette casing wherein said shutter member is movable between a first position in which it covers the opening and a second position in which it exposes the opening, and a locking means for normally holding said shutter member respectively in each said first and second positions and structurally adapted to allow said shutter member to move from said first position to said second position when said cassette is inserted into an associated recording and reproducing apparatus, and from said second position to said first position when said cassette is ejected, said cassette holder comprising:*

*means incorporated in said cassette holder and cooperatively associated with said locking means on said cassette during both insertion and ejection for unlocking said locking means, said unlocking means including an insertion unlocking portion active at said first position of said shutter member to allow movement of said shutter member from said first position to said second position when said magnetic tape cassette is inserted into said cassette holder and an ejection unlocking means active for unlocking said locking means at said second position of said shutter member for allowing movement of said shutter member from said second position to said first position when said magnetic tape cassette is ejected from said recording and reproducing apparatus.*

*37. The cassette holder as set forth in claim 36, wherein said unlocking means comprises a projection means projecting from a floor of said cassette holder, said projection means defining both said insertion unlocking means and said ejection unlocking means.*

*38. The cassette holder as set forth in claim 37, wherein said insertion unlocking means comprises an edge of said projection means for actuating said locking means into an unlocking position to allow said shutter member to move from said first position to said second position during insertion of said magnetic tape cassette into said cassette holder.*

*39. The cassette holder as set forth in claim 37, wherein said ejection unlocking means comprises another edge of said projection means for actuating said locking means into an unlocking position to allow said shutter member to move from said second position to said first position during ejection of said magnetic tape cassette from said cassette reception space in said holder.*

*40. The cassette holder as set forth in claim 36, wherein said cassette holder defines a projection having a first tapered end and said cassette defines a cut-out which receives said projection upon insertion of said cassette into said cassette holder.*

*41. The cassette holder as set forth in claim 36, wherein said cassette further includes a front end cut-out on said sliding shutter member so that when the cassette is fully inserted into said cassette holder and said sliding shutter*

*member is in its predetermined rearwardmost position, said locking head engages said front end cut-out to lock said sliding shutter member in its rearwardmost position.*

*42. A magnetic-tape-cassette apparatus for receiving a magnetic-tape cassette, wherein*

*said cassette comprises a housing having first and second major walls which are parallel to one another, two side walls, a rear wall, and an opening at the front which extends back into the first major wall;*

*two reels hubs supported between the major walls so as to be rotatable about axes which extend perpendicularly to the major walls;*

*the first major wall having two openings through which the reel shafts of a magnetic-tape cassette apparatus can be coupled to the reel hubs, and a magnetic tape being wound around the reel hubs with a part of the tape extending across the front opening;*

*a front cover movable between closed and open positions and comprising a main portion, which in the closed position of the front cover covers the front opening and the part of the magnetic tape which extends across the front opening, and side flanges which are situated one adjacent each side wall of the housing and which are pivotally connected to said side walls; and*

*a sliding plate which is situated on the outside of the housing and which comprises a main portion which is situated adjacent the first major wall of the housing, the sliding plate being slidably guided on the housing for movement parallel to the first major wall towards the rear wall from a closed position, where the sliding plate latches the front cover in the closed position and the main portion of the sliding plate covers the front opening where this opening extends back into the first major wall, to an open position to unlatch the front cover and to give access to the front opening for the passage thereinto of a tape-withdrawal means of a magnetic-tape-cassette;*

*wherein said cassette, said second major wall is imperforate over its entire area and the main portion of the front cover is contiguous with said second major wall in the closed position of said cover;*

*said main portion of the sliding plate extends rearwardly beyond the two openings in the first major wall in the closed position of the sliding plate to cover said openings and has two apertures which expose said openings when the sliding plate is in the open position;*

*the sliding plate being locked in the closed position by at least one locking member which comprises a locking portion and a top portion;*

*the main portion of the sliding plate being formed with first and second engage portions which are arranged on a single straight line, the top portion of the locking member capable of being projected from either the first or second engage portions, the locking portion being engaged to the first engage portion when the slide plate covers the front opening, and the locking portion being engaged to the second engage portion when the slide plate opens the front opening; and*

*said cassette apparatus comprises a means for receiving said cassette by insertion of the cassette into the apparatus,*

*said means for receiving includes an unlatching member arranged to release the locking portion from the first engage portion during relative motion of the cassette with respect to the apparatus, until said relative movement brings said locking portion of the locking member into the second engage portion into engagement with an unlatching member, wherein*

*said unlatching member is arranged such that upon further insertion movement of the cassette into the apparatus, said unlatching member thrusts up said locking member so as to unlock the sliding plate.*

*43. The magnetic-tape-cassette apparatus for receiving a magnetic-tape-cassette according to claim 42, wherein said cassette further comprises a partition separating said front opening from the interior of said housing.*

*44. A method of automatically opening a magnetic-tape cassette upon insertion of the cassette into a magnetic tape apparatus, comprising*

*providing a cassette comprising a housing having first and second major walls which are parallel to one another, two side walls, a rear wall, an opening at the front which extends back into the first major wall, two reel hubs, a magnetic tape wound around said reel hubs with a part of the tape extending across said front opening, a front cover, a sliding plate movable between closed and open plate positions, and means for locking said plate alternatively in said open position or closed position;*

*said cover being pivotable between closed and open cover positions and in the closed cover position the cover covering the front opening and the part of the magnetic tape which extends across the front opening,*

*said sliding plate being disposed on the outside of said housing and comprising a main portion adjacent the first major wall of the housing, said plate being slidably guided on the housing for movement parallel to the first major wall towards the rear wall from the closed plate position,*

*said sliding plate having a main portion, which in the closed plate position covers the front opening where said opening extends back into the first major wall and which in the open plate position is clear of said front opening to provide access through the front opening into a space behind said part of said tape;*

*said cassette further comprising a means for latching said cover in the closed cover position responsive to said plate being in the closed plate position, said main portion of the sliding plate having first and second engage portions which are arranged on a single straight line extended rearwardly from a front edge of the main portion of the sliding plate,*

*said means for locking said plate further comprising at least one locking member having a locking portion for locking said sliding plate in the closed plate position and a top portion which in the closed plate position projects into said first engage portion;*

*providing a magnetic tape apparatus having a loading mechanism with an unlatching member arranged stationary in said loading mechanism;*

*inserting said cassette into said loading mechanism;*

*unlocking and moving the sliding plate of the cassette from the closed plate position to the open plate position by relative movement of the cassette with respect to the apparatus during insertion of the cassette into the loading mechanism;*

*engaging the unlatching member to the top portion of the locking member; and*

*thrusting up said locking member as a result of further insertion movement of the cassette to unlock the sliding plate from the closed plate position.*

*45. A cassette holder in a recording and/or reproducing apparatus for a magnetic tape cassette comprising a cassette casing having a mouth through which a magnetic tape is accessible, said mouth including a first opening in a front end face to said casing and a second opening in a lower*

*section of the casing adjacent said front end face, a pair of tape reels around which said magnetic tape is wound, a pivotal lid covering and exposing said first opening of said mouth, a sliding shutter member slidable with respect to the lower section of said cassette casing and adapted to cover and expose said second opening in said lower section, said shutter member being movable between a first position in which it covers said second opening and a second position in which it exposes said second opening, and a locking means for normally holding said shutter member in both of said first and second positions and allowing said shutter member to move from said first position to said second position when said cassette is inserted into an associated recording and/or reproducing apparatus, and from said second position to said first position when said cassette is ejected said cassette holder comprising:*

*a holder body defining a cassette reception space and having a floor on which said cassette is mounted; and* unlocking means, incorporated into said holder body and cooperatively associated with said locking means, for unlocking said locking means,

*said unlocking means having a first component active at said first position of said shutter member to allow movement of said shutter member from said first position to said second position when said magnetic tape cassette is inserted into said cassette reception space, and a second component active for unlocking said locking means at said second position of said shutter member for allowing movement of said shutter member from said second position to said first position when said magnetic tape cassette is ejected from said recording and/or reproducing apparatus.*

*46. The cassette holder according to claim 45, wherein said unlocking means comprises a projection means projecting from said floor of said holder body.*

*47. The cassette holder according to claim 45, wherein said holder body further comprises a pair of projections projected from said floor of said holder body at the rear edge of said floor, said projections engaging said shutter member when the cassette is inserted into said holder body.*

* * * * *